May 28, 1968 N. B. MEARS 3,385,745

SYSTEM FOR PROCESSING CONTINUOUS WEBBING

Filed Feb. 19, 1965 2 Sheets-Sheet 1

INVENTOR
NORMAN B. MEARS
BY *Stryker and Jacobson*
ATTORNEYS

INVENTOR
NORMAN B. MEARS
BY
ATTORNEYS

United States Patent Office 3,385,745
Patented May 28, 1968

3,385,745
SYSTEM FOR PROCESSING CONTINUOUS
WEBBING
Norman B. Mears, Dakota County, Minn., assignor to
Buckbee-Mears Company, St. Paul, Minn., a corporation of Minnesota
Filed Feb. 19, 1965, Ser. No. 433,950
10 Claims. (Cl. 156—345)

ABSTRACT OF THE DISCLOSURE

A continuous strip of metal webbing which may be, for example, stainless steel measuring approximately 21 inches wide and .01 inch thick, is fed on edge through a number of treating stations for a series of processing operations. The webbing may be fed through some of the stations at a continuous velocity and through others in an intermittent stop and go manner. Between these processing stations are located take-up and feed mechanisms comprising movable vertical rollers through which the webbing is threaded and which operate to take up any slack that develops in the webbing to maintain a constant tension to prevent the webbing from creasing or bending as it travels between the processing stations.

---

Figure 1A:
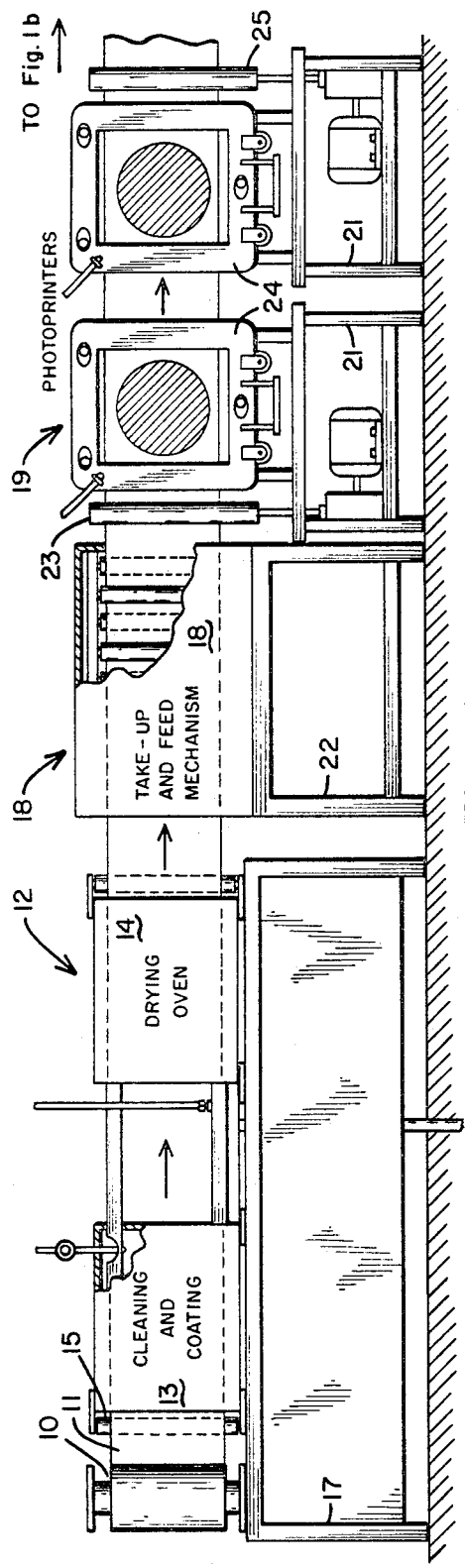

This invention relates generally to a system for processing a continuous sheet of webbing by passing it through a plurality of processing stations. More particularly, the invention is directed toward a system for processing vertically-oriented, metallic webbing as it passes edgewise through a series of processing stations which treat the face of the webbing in a vertical plane.

It is not uncommon to treat a continuous strip or web of material while it is lying horizontally and to advance it from one station to another in the processing system while it remains in the horizontal orientation. This is a natural position for the webbing so there are few difficulties encountered when transferring and handling the webbing in this manner. When it becomes necessary or desirable to process the webbing while it is on edge and in a vertical plane, the handling of the webbing between the various processing stations and within the stations, presents a much more difficult problem. An example of this is in the manufacture of precision articles from a continuous metallic webbing using photographic printing and etching techniques. In order to manufacture some of these articles with the required high degree of precision, it may be necessary to etch them out of the metal by applying the etchant concurrently to both faces of the webbing. Apertures formed through the metal in this manner then will generally have the required high degree of precision. In order to etch satisfactorily on both faces of the webbing, it is necessary first to photoprint the desired pattern of the article in very accurate registration on the opposite face. This means, in turn, that the light-sensitive coating or enamel which is used in the photoprinting process must be applied in a uniform manner to both faces of the webbing. It has been found that it is preferable to subject the webbing to all of these steps in the manufacturing process while it is on edge in a vertical plane. Typically, the light-sensitive coating or enamel may be applied in the manner as described in Patent 2,791,514. As described in detail therein, the enamel is applied in liquid form to the top marginal edge of the thoroughly cleaned metallic web and allowed to flow downward freely over both faces of the webbing and in this manner uniformly coats both faces of the webbing as it travels edgewise through the coating station. The coated webbing then passes through an oven where the enamel is hardened or baked on. After the light-sensitive coating has been applied, the desired pattern of the article being manufactured may be photoprinted in a manner such as described in my copending application Ser. No. 388,077, filed Aug. 7, 1964, titled Automatic Multiple Photoprinting System. As described more thoroughly therein, the pattern of the article may be an array of apertures through the metal which are defined by opaque and transparent areas which are arranged in a suitable manner on a photoprinting master plate or mask. The pattern is then photoprinted by bringing the plates into contact with the opposite faces of the coated metallic webbing while the plates are kept accurately registered to one another. The webbing is conveyed lengthwise on edge into the photoprinting station and is fed in a cyclical stop-and-go manner. While photoprinting, the feed is stopped. After a suitable time, the webbing is advanced through the photoprinting station until properly located to photoprint on another set of patterns. Then the feed again stops. This is a repetitive cycle. After the photoprinted pattern has been developed out, the webbing goes through an etching process. This may be done in the manner and by the apparatus as described in Patent 2,822,635. As described more thoroughly therein, the vertically oriented webbing is conveyed on edge through a series of chambers including one in which an etching solution is impinged upon both faces of the webbing as it passes through at a constant rate. The etchant forms the precision apertures in the metal webbing wherever the enamel coating has been removed.

Heretofore, the practice has been to operate each of the processing stations independently and separately. The webbing is fed into each station from a supply reel and coiled up on a take-up reel located at the output of each of the respective processing stations. The take-up reel of one station, when fully loaded, is then carried over to the next processing station and there becomes the input or supply reel for the next station. The principal reason for this has been the difficulty encountered in handling the metallic webbing as it travels between the processing stations. The webbing which travels lengthwise and on edge, is relatively thin metal in the order of .001 to .010 inch thick so has a tendency to bend or twist unduly because of its malleability and flexibility. This can cause wrinkles, creases or scratches which are harmful to the coating so that a large number of unusable units may be produced. Compounding the difficulty which is normally encountered in trying to maintain webbing in a vertical plane on edge between the processing stations is the fact that the webbing is fed in an intermittent manner into and out of the photoprinting station whereas the webbing travels at a constant rate of feed through the coating and etching stations.

It is a general object of this invention to provide a system for processing a continuous vertically oriented webbing as it travels lengthwise on edge.

It is a more specific object of this invention to provide a system for processing a continuous webbing which travels lengthwise on edge through a plurality of processing stations with means for preventing damage from occurring to the webbing due to its flexibility as it travels between stations.

Another object of this invention is to provide a system for treating continuous webbing as it travels lengthwise on edge through a plurality of processing stations, each of which may have different rates of feed.

Still another object of this invention is to maintain longitudinal tension on a continuous webbing as it travels lengthwise on edge from one processing station to another.

Yet another object of this invention is to provide means for maintaining a continuous webbing in its vertical orientation as it travels lengthwise on edge between processing stations, one of which has a constant rate of feed and the other of which has a cyclical stop-and-go rate of feed.

Yet still another object of this invention is to maintain longitudinal tension on a continuous, flexible webbing as it passes lengthwise on edge between a plurality of processing stations operating at different rates of feed whereby harmful wrinkling, creasing or undue bending of the metal is prevented.

In the preferred embodiment of this invention which will be described subsequently in greater detail, a take-up and feed mechanism is located between each of the processing stations. The vertically oriented webbing passes lengthwise on edge through each of these mechanisms as it travels between the processing stations. The mechanism preferably is constructed with two sets of rollers with the webbing threaded circuitously amongst the various rollers. One set of rollers is movable laterally with respect to the other set of rollers. During normal operation of the system, any slack of the webbing which would otherwise occur as the webbing passes between the processing stations due to differences in the feed rates, is taken up by moving the movable set of rollers laterally with respect to the fixed set of rollers, thereby maintaining a continuous longitudinal tension on the webbing. For example, when the feed through the photoprinting station is in the stop condition, the movable set of rollers in the take-up and feed mechanism at the input side of this station, which is continuously receiving webbing from the coating station, will be moved laterally away from the fixed set of rollers thereby taking up any slack in the webbing and maintaining tension on it. Concurrently, in the similar mechanism at the output side of the photoprinting station, the movable set of rollers will be moved back toward the fixed set of rollers which allows the webbing to be continuously fed into the etching station while keeping it in tension even though there is no webbing fed through the photoprinting station. Preferably, the rollers are constructed of a substance such as a relatively hard rubber so that even though they are in contact with the webbing they will not scratch it or otherwise injure it and at the same time the rollers will be sufficiently durable so that they are not easily cut by the edges of the webbing.

Figure 1B:
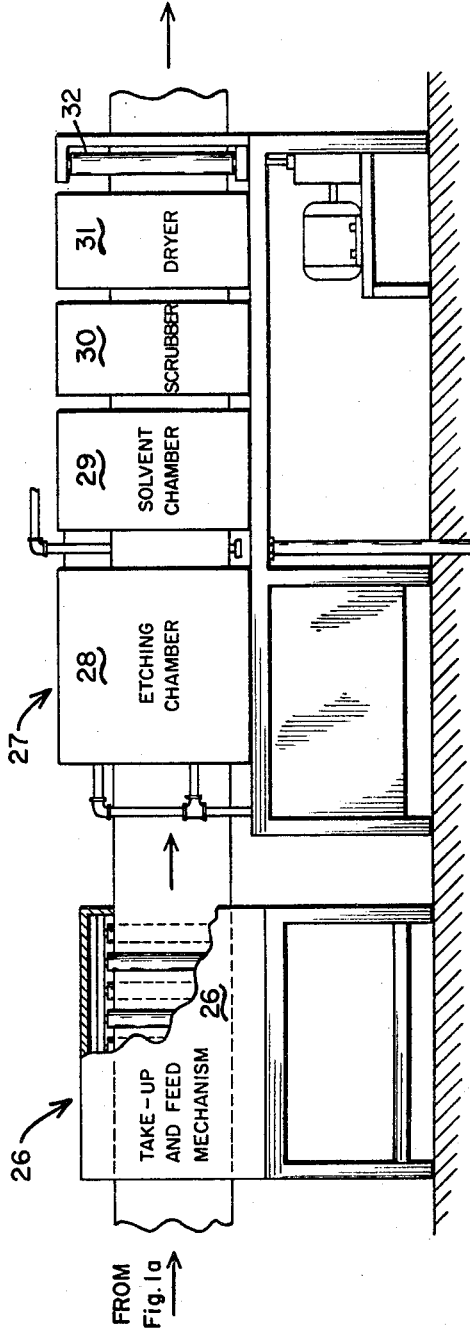
Figure 2:
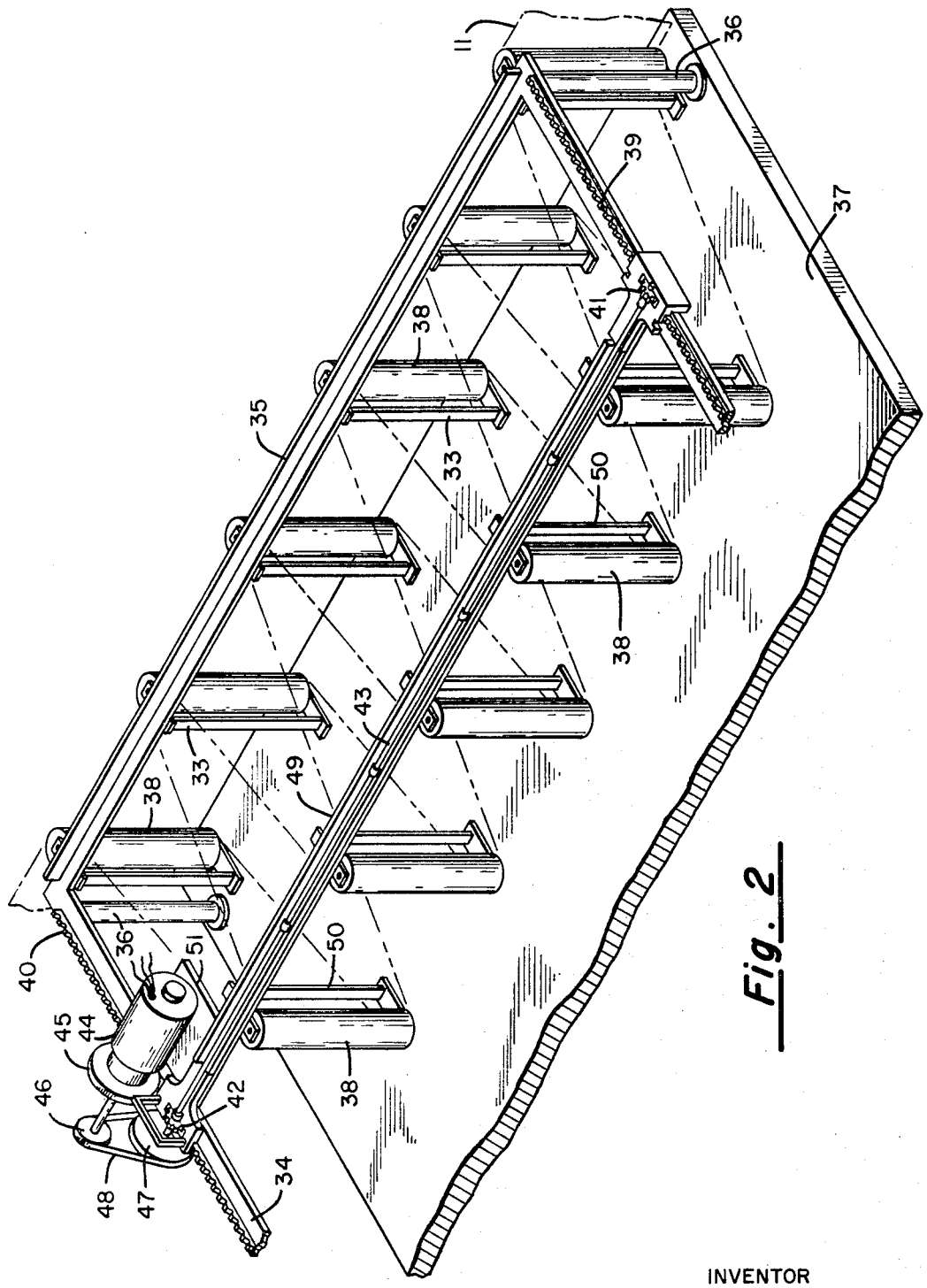

These and other more detailed objects and features of this invention will become apparent during the course of the following detailed description with reference to the drawings in which:

FIG. 1, which is separated for convenience into 1a and 1b, illustrates in schematic form a system embodying the instant invention, and FIG. 2 is a perspective view showing in some detail the construction of a preferred embodiment of the take-up and feed mechanism which is located between each of the processing stations of FIG. 1 and which constitutes a part of this invention.

Referring now to FIG. 1, a supply reel 10 containing a roll of metallic webbing 11 is located at the leftmost or input side of the processing system. In this processing system the webbing may be any metal but is preferably copper, nickel, tin or stainless steel which ranges in the order of 21 inches wide, no limitation thereto being intended. The supply reel 10 is mounted vertically in a manner such that the webbing 11 may be unreeled therefrom so that it travels on edge in a vertical plane into the first processing station, which is designated generally as coating station 12. Details of a coating process and apparatus for coating the webbing which constitutes the construction of the coating station 12 are contained in Patent 2,791,514. The function and structure of the coating station do not constitute part of the instant invention per se so will only be briefly described herein. Typically the webbing passes lengthwise on edge through cleaning and coating chambers 13 wherein both faces of the webbing are thoroughly cleaned and coated with a light-sensitive enamel in liquid form. The liquid enamel is applied at the upper edge of the webbing and allowed to flow freely downward over the surfaces of the webbing as it passes through the chamber at a constant feed rate. In this manner the webbing is uniformly coated overall. From chamber 13 the webbing passes lengthwise through a drying oven 14 where the light-sensitive enamel is hardened by baking. The webbing 11 passes through the coating station 12 at a relatively constant rate of feed which may range anywhere from 25 to 100 linear inches per minute in a typical case. This rate is generally dependent upon the rate of feed through the etcher. Means are provided within the coating station 12 for keeping the webbing vertically oriented within the various chambers and as it travels through the station. Idler rollers 15 and 16 at the input and output respectively assist in keeping the webbing in line. The complete station is suitably mounted on a rigid supporting structure 17.

After the coating on the webbing has been dried adequately, it travels out of the coating station 12 into a first take-up and feed or tensioning mechanism which is generally designated as 18. The construction of this mechanism 18 will be described later in detail. For the present, suffice it to note that the function of this mechanism is to maintain the metallic webbing 11 vertically oriented as it travels on edge between the coating station 12 and the photoprinting station 19. It provides sufficient tension on the webbing to prevent any creasing, wrinkling or undue bending which would cause damage to the metal material or the light-sensitive coating. At the same time it must allow the webbing to travel from one station to the next as the feed demands. The take-up and feed mechanism 18 is suitably mounted on or in a rigid support 22 so that the webbing 11 passing therethrough is at the same elevation as at the coating station 12.

From the take-up and feed mechanism 18 the webbing 11 continues rightwardly into the photoprinting station 19. Details of the photoprinting process and a suitable apparatus used in the photoprinting station 19 are contained in my copending application Ser. No. 388,477, filed Aug. 7, 1964, now U.S. Patent 3,256,562, tilted Automatic Multiple Photoprinting Sytem. Since the internal operation of the photoprinting station per se does not constitute part of the instant invention, it will only be described briefly. At the input side of the photoprinting station 19 is a set of motor driven pinching rollers 23 which assist in feeding the webbing 11 into the photoprinting station. Within the photoprinting station the pattern of the article which is to be etched out is photoprinted onto the light-sensitive coating on the metallic webbing. This is done by directing a suitable actinic light through a mask or plate contained in printing frames 24. The mask comprises an array of transparent and opaque areas which define the desired pattern. In order to make the apertures through the metal with the degree of accuracy which is required, it is necessary to etch out these apertures from both faces of the metallic webbing. Therefore, the desired patterns must be photoprinted onto the opposed faces of the webbing while in very accurate registration.

At the rightmost or output side of the photoprinting station 19, another pair of motor driven pinching rollers 25 assist in feeding the webbing through the photoprinting station 19. While the pattern is being photoprinted, the webbing must be held stationary within the station so the fed through the photoprinting station is in a cyclical stop-and-go manner. After the pattern has been photoprinted, the webbing is advanced through the photoprinting station to bring another section of the webbing into the printing frames 24 so that the pattern is repetitively photoprinted on contiguous areas of the webbing. It can be seen that when the feed through the photoprinting station 19 is in the advance or go condition, the webbing is fed through the photoprinting station at a rate faster than that of the coating station 12 to make up for the period of time when there is no feed. Similarly, it will be seen that the rate at which the webbing passes through the photoprinting station when the feed is in the advance condition is more rapid than the constant rate of feed through the following processing station. Difficulties which have been encountered in trying to make one continuous processing system which incorporated multiple processing stations of this nature, now become clarified. Solution of the problems by the construction and use of the take-up and feed mechanism will be shown shortly. The photoprinting apparatus is also mounted on suitable rigid supports 21 so that the webbing is kept at the same elevation.

From the output of the photoprinting station 19, the webbing passes through another take-up and feed mechanism 26 which is constructed identically to that of take-up and feed mechanism 18. The function of the former is the same as that of the latter, that is, to ensure that the webbing is maintained in its vertical orientation without being damaged. Detailed description of the construction and operation is contained hereinbelow.

From the mechanism 26, the webbing travels rightwardly into the etching station 27. Details of the etching process and apparatus which makes up the etching station 27 can be found in Patent 2,822,635. These do not constitute, per se, a part of this invention so will only be briefly described herein. Typically, the station comprises an etching chamber 28, solvent chamber 29, scrubbing chamber 30 and a dryer 31. In the etching chamber 28 liquid etchant is caused to impinge on the faces of the vertically oriented webbing as it travels at a constant rate of feed therethrough. In this manner the desired apertures which are defined by the pattern which had been previously photoprinted on the light sensitized coating are etched out of the metal. The articles which are formed in this manner are still carried by the webbing and are conveyed through chambers 29, 30 and 31 for suitable cleaning and drying. A motor-driven set of pinch rollers 32 at the output side of the etching station provide a power-actuated drive to pull the webbing through the station and feed it out at a constant rate.

It can now be visualized that the constant rate of feed of the webbing through the coating station 12 and the etching station 27 must be coordinated with the intermittent feed through the photoprinting station 19. Furthermore, it can be seen that because of the intermittent feed through the photoprinting station 19, there is a tendency for slack to develop in the webbing between the stations. This slack could result in creasing, wrinkling or undue bending of the webbing causing it to become scratched or broken or causing cracking or other defects in the light-sensitive coating thereby resulting in a defective end product.

The construction of the take-up and feed mechanisms 18 and 26 and the manner in which they operate will now be described with reference to FIG. 2. A rigid frame having a pair of parallel side members 35 (only one is shown in the drawing) and a pair of parallel end members 34 which are joined together to form a rectangular framework, is firmly attached, such as by supporting columns 36 at the corners, to a supporting base 37. A set of six cylindrical rollers 38 are vertically mounted within their respective brackets 33 which are suitably attached to the side member 35. These rollers are journaled within the brackets so they are free to rotate in the manner of idler rollers. Rack gears 39 and 40 are respectively mounted on the top of the right and left hand end members 34. Engaged with these rack gears 39 and 40 are pinion gears 41 and 42 respectively, which are attached to opposite ends of an elongated shaft 43 which extends between the two end members 34. The shaft 43 is driven by an electric motor 44 which is coupled to the shaft through a magnetic clutch 45 and a pair of pulleys 46 and 47 which are coupled together by a belt or chain 48. The shaft 43 is carried by an elongated rigid carriage member 49 which is parallel to the side member 35. As the shaft 43 rotates the meshing of the rack and pinion gear combinations on the two end members 34 cause the carriage member 49 to move toward and away from the side member 35. Another set of five cylindrical rollers 38 are vertically mounted within their respective brackets 50 which are attached to the carriage member 49 spaced at equidistant intervals lengthwise the latter member. In like manner as the rollers attached to side member 35, this set of five rollers are journaled within the brackets 50 so that they are free to rotate as idler rollers. Attached near one end of the carriage member 49 is a platform 51 on which the motor 44 sets. The motor 44, the shaft 43, the couplings between the two and the set of five rollers 38 all are carried by the carriage member 49 as it travels away from and back toward the side member 35. The metallic webbing 11 is shown in shadow line and is circuitously threaded amongst the various rollers 38 of the two sets in a manner such that it alternately bends around a roller of the immovable set and then one of the movable set.

With relation to the operation of the take-up and feed mechanism in the over-all operation of the system shown in FIG. 1, consider first mechanism 18 which is located between the coating station 12 and the photoprinting station 19. The webbing 11 as it emerges from the coating station 12 enters into the take-up and feed mechanism at the upper left of FIG. 2 and then passes into the photoprinting station 19 from the lower right of FIG. 2. During normal operation, the motor 44 and the magnetic clutch 45 are energized so that through the combination of pulleys 46 and 47 and the interconnecting drive chain 48, shaft 43 is caused to rotate in a direction which causes the rack and pinion gear assemblies, 42 with 40 and 41 with 39, to try to move the carriage member 49 laterally away from the side member 35. This then has the effect of continuously trying to take up the webbing which is being continuously outputted at a constant rate from the coating station 12, and keeping a continuous tension on the webbing as it travels between the coating station 12 and the photoprinting station 19. First assume that the feed into the photoprinting station 19 is in the stop condition so that the webbing at the lower right of FIG. 2 is prevented from advancing into the photoprinting station 19. This may be done by deenergizing the motors which drive the pinching rollers 23 and 25 (FIG. 1a). The carriage member 49, however, is being driven laterally away from the side member 35 by the actuating force of motor 44 so as to take up any slack which otherwise would have developed between the two stations. This action keeps continuous tension on the webbing in a longitudinal direction to maintain the desired orientation and to prevent it from creasing, wrinkling or bending in a harmful manner. After the period of time allotted for photoprinting, feed through the photoprinting station 19 is placed in the advance condition by energizing the motors which drive the pinching rollers 23 and 25 (FIG. 1a). The force applied to the webbing by these pinching rollers to feed it through the photoprinting station is sufficient to overcome the forces acting on the magnetic clutch 45 so that the clutch slips and the carriage member 49 which carries the set of five rollers moves laterally back toward the side member 35. The webbing 11 then advances into the photoprinting station 19 out of the bottom right of FIG. 2, and is maintained in its vertical orientation. Even though during this time the webbing is still being fed out of the coating station 12 into the upper left of FIG. 2, it is at a much slower rate than that at which the webbing is advancing through the photoprinting station. When an appropriate length of the webbing has been fed into the photoprinting station the feed therethrough is again stopped and the magnetic clutch 45 once again becomes effective. The carriage member 49 with its set of rollers 38 moves away from the side member 35 and once again starts to take up the webbing which is being continuously outputted by the coating station. This manner of operation repeats in a cyclical manner in conformance with the cyclical feed through the photoprinting station.

The operation of the take-up and feed mechanism 26 which is located between the photo-printing station and the etching station 27 is virtually identical to that described above but, of course, functions just oppositely with relation to the feed through the photoprinting station 19. When the fed through the photoprinting station is in the stop condition, the feed through the etching station 27 is being continued by the action of the motor driven pinch rollers 32 (FIG. 1b). During this period of time no webbing is entering mechanism 26 at the upper left of FIG. 2, and the pulling force on the webbing 11 imparted by the pinch rollers 32 is sufficient to overcome the holding force of the magnetic clutch 45 causing the latter to slip so that the carriage member 49 moves laterally toward the side member 35 to enable the webbing to be continuously fed into the etching station. When the feed through the photoprinter station 19 is in the advance condition, the magnetic clutch 45 resumes control even though the webbing is being continuously fed out the lower right of FIG. 2 and through the etching station. The feed through the photoprinting station 19 into the upper left of FIG. 2 is considerably faster than that through the etching station during this advance portion of the cycle so that the carriage member 49 moves its set of rollers laterally away from the side member 35 to take up the webbing and prevent the occurrence of slack which otherwise would have developed due to the difference in the rate of travel of the webbing through the two stations. This manner of operation continuously repeats in a cyclical manner in conformance with the corresponding operation of the feed through the photoprinting station. The movable set of rollers in mechanism 18 are moving away from the fixed set while the movable set in mechanism 26 are moving toward the fixed set when the feed through the photoprinting station is in the stop condition, mutatis mutandi when the feed through the photoprinting station is in the advance condition.

Preferably the rollers 38 are constructed of a material which will not scratch or otherwise mar the metal web or its coating and which will not be easily cut or chipped by the edges of the webbing so that it will have prolonged use. It can be seen that the number of rollers, the spacing of the rollers, the length of the take-up and feed mechanism, the amount which the carriage must move laterally, and various other things are all matters of choice or design. Various factors will be taken into account by those of ordinary skill in the design of apparatus constructed according to this invention. Among these factors are the differences in rate of feed, space availability, forces which can be applied to the webbing and many others. In any event, it can be seen that apparatus constructed according to the teachings of this invention provides the sought after objectives.

I claim:
1. An automatic continuous system for processing webbing, comprising in combination:
    (a) one processing station for treating a continuous sheet of flexible webbing as it passes lengthwise through the station at a constant rate of feed in a substantially vertical plane;
    (b) another processing station for treating said continuous sheet of webbing as it passes lengthwise through said another station at an intermittent rate of feed while in a substantially vertical plane;
    (c) a multiplicity of vertically oriented cylindrical rollers located between said processing stations; and
    (d) means for moving some of said rollers laterally with respect to others of said rollers while the webbing is threaded among and is in contact with the rollers for maintaining continuous tension on and vertical orientation of said webbing as it travels between the processing stations.

2. An automatic contiuous processing system for flexible metallic webbing, comprising in combination:
    (a) a first processing station for treating a continuous sheet of flexible metallic webbing as it passes lengthwise on edge through said first processing station at a substantially constant rate of feed;
    (b) a second processing station for further treating said continuous sheet of metallic webbing as it passes lengthwise on edge through said second processing station at a cylical stop and go rate of feed;
    (c) a third processing station for still further treating said continuous sheet of metallic webbing as it passes lengthwise on edge through said third station at a substantially constant rate of feed;
    (d) first and second groups of vertically oriented cylindrical rollers respectively located between said first and second processing stations and between said second and third processing stations; and
    (e) means for moving at least some of said rollers in each group laterally away from and back toward others of said rollers in each group while the webbing is threaded among and in contact with said rollers for maintaining tension on the webbing whereby the webbing is free to travel between said stations while being maintained in uniform vertical orientation without creasing.

3. The invention as described in claim 2 wherein each of said groups of rollers comprises:
    (a) first and second sets of vertically oriented cylindrical rollers; and
    (b) means for moving one of said sets in each group laterally away from and back toward the other set in the group when the webbing is threaded among and in contact with said rollers for maintaining continuous tension on the webbing as it travels between the stations.

4. The invention as described in claim 3 including:
    (a) means for moving the first set of rollers in said first group away from the second set in said first group while the feed through the second station is stopped and for moving said first set in said first group toward the second set in said first group while the feed through the second station is advancing; and
    (b) means for moving the first set of rollers in said second group away from its second set while the feed through the second station is advancing and for moving the first set in said second group toward its second set while the feed through the second station is stopped; thereby
    (c) maintaining continuous longitudinal tension on the webbing for maintaining it uniformly vertically oriented as it travels between the processing stations.

5. In an automatic continuous processing system for flexible metallic webbing, in combination:
    (a) a first processing station for treating a continuous sheet of flexible metallic webbing as it passes lengthwise on edge through said first processing station at a substantially constant rate of feed;
    (b) a second processing station for further treating said continuous sheet of metallic webbing as it passes lengthwise on edge through said second processing station in a cylical advance and manner;
    (c) a third processing station for still further treating said continuous sheet of metallic webbing as it passes lengthwise on edge through said third station at a substantially constant rate of feed;
    (d) first and second sets of vertically oriented cylindrical rollers disposed between said first and second processing stations;
    (e) means for moving said first set of rollers laterally away from the second set of rollers while the feed through the second station is stopped and for moving said first set of rollers laterally back toward the second set of rollers while the feed through the second station is advancing when said webbing is threaded among and in contact with said rollers;
(f) third and fourth sets of vertically oriented cylindrical rollers disposed between said second and third processing stations;
(g) means for moving said third set of rollers laterally away from said fourth set of rollers while the feed through the second station is advancing and for moving the third set of rollers laterally back toward the fourth set of rollers while the feed through the second station is stopped when said webbing is threaded among and in contact with said third and fourth sets of rollers;
(h) said sets of rollers thereby maintaining continuous longitudinal tension on the webbing for maintaining it substantially in uniform vertical orientation without creasing as it travels between said processing stations.

6. In a system for processing a continuous, vertically oriented webbing which passes lengthwise between two adjacent operating stations, one having a constant rate of feed and the other having a cyclical advance and stop rate of feed, apparatus for maintaining the webbing uniformly in the vertical as it travels between the stations, comprising: first and second sets of vertically oriented cylindrical rollers, the webbing circuitously threaded among the various rollers in contact therewith; and means for moving one of said sets of rollers laterally back and forth with respect to the other of said sets as the feed through the other processing station cyclically stops and advances.

7. In a system for processing a continuous vertically oriented webbing which passes lengthwise on edge between two adjacent processing stations, one having a constant rate of feed and the other having a cyclical advance and stop rate of feed, apparatus for maintaining the webbing uncreased and in the vertical as it travels between the stations, comprising:
(a) a first set of vertically oriented cylindrical rollers journaled in a fixed frame;
(b) a second set of vertically oriented cylindrical rollers journaled in a carriage which is movable laterally away from and back toward the first set of rollers;
(c) the webbing being circuitously threaded among the various rollers and in contact therewith;
(d) means for applying a driving force to said carriage for driving the carriage away from the first set of rollers whereby continuous longitudinal tension is maintained on the webbing;
(e) said driving means being effective to move the carriage away from the first set of rollers only when the cyclical rate of feed is in one condition;
(f) and means for moving the carriage back toward the first set of rollers in opposition to said driving means when the cyclical rate of feed is in the other condition.

8. In a system for processing a continuous strip of vertically-oriented flexible metallic webbing, said webbing having its longitudinal margins extending horizontally and passing through first and third processing stations at a constant feed rate and through a second station located between said first and third stations at a cyclical advance and stop feed rate, apparatus for maintaining the webbing in a vertically stable condition, comprising:
(a) a first set of vertically positioned cylindrical rollers journaled in a stationary frame and a second set of similar rollers journaled in a first movable carriage, the metallic webbing being circuitously threaded among the various rollers of said first and second sets as it passes out of the first processing station to the second station;
(b) a third set of vertically positioned cylindrical rollers journaled in a stationary frame and a fourth set of similar rollers journaled in a second movable carriage, the metallic webbing being circuitously threaded among the various rollers of said third and fourth sets as it passes out of the second station to the third station;
(c) first means for continuously applying a force to drive said first carriage laterally away from said first set of rollers, the force from said first means being effective to so move the first carriage only when the feed through the second station is in the stop condition;
(d) second means for continuously applying a force to drive said second carriage laterally away from said third set of rollers, the force from said second means being effective to so move the second carriage only when the feed through the second station is in the advance condition;
(e) means for applying a force opposite that of said first means for moving the first carriage back toward the first set of rollers when the feed through the second station is in the advance condition; and
(f) means for applying a force opposite that of said second means for moving the second carriage back toward the third set of rollers when the feed through the second station is in the stop condition.

9. A system for processing a continuous flexible metallic web in a vertical plane with its longitudinal margins extending horizontally, comprising in combination:
(a) a first processing station for applying a coating of light-sensitive material to at least one face of the metal webbing as it continuously passes lengthwise on edge therethrough at a constant feed rate;
(b) a second processing station for photoprinting a predetermined pattern of transparent and opaque areas onto the coated face of the webbing received from the first station as it passes lengthwise on edge therethrough at a cyclical stop-and-advance feed rate;
(c) a third processing station for etching away certain of the areas of the webbing received from the second station in accordance with the pattern photoprinted thereon as the webbing passes continuously lengthwise on edge therethrough at a constant feed rate;
(d) first and second sets of vertically mounted, parallel, cylindrical rollers with the webbing threaded circuitously among said rollers as it passes between said first and second processing stations;
(e) third and fourth sets of vertically mounted, parallel, cylindrical rollers with the webbing threaded circuitously among said latter rollers as it passes between said second and third processing stations; and
(f) means for moving said second and fourth sets of rollers laterally back and forth with respect to said first and third sets respectively whereby continuous longitudinal tension is kept on the webbing between the processing stations to prevent undue flexing.

10. A system for processing a continuous flexible metallic web in a vertical plane with its longitudinal margins extending horizontally, comprising in combination:
(a) a first processing station for applying a coating of light-sensitive material to at least one face of the metal webbing as it continuously passes lengthwise on edge therethrough at a constant feed rate;
(b) a second processing station for photoprinting a predetermined pattern of transparent and opaque areas onto the coated face of the webbing received from the first station as it passes lengthwise on edge therethrough at a cyclical stop-and-advance feed rate;
(c) a third processing station for etching away certain of the areas of the webbing received from the second station in accordance with the pattern photoprinted thereon as the webbing passes continuously lengthwise on edge therethrough at a constant feed rate;
(d) a first set of cylindrical rollers vertically mounted parallel to one another in spaced-apart relation in a fixed frame member and a second set of cylindrical rollers similarly mounted in a movable member which is parallel to said fixed member;

(e) the webbing which passes between said first and second stations being circuitously threaded among the various rollers of said first and second sets;

(f) driving means coupled to said movable member for continuously applying a force thereto tending to move said movable member laterally away from said fixed member, said force being effective to so move the movable member only when the feed through the second station is in the stop condition;

(g) a third set of cylindrical rollers vertically mounted parallel to one another in spaced-apart relation in a fixed frame member and a fourth set of cylindrical rollers similarly mounted in a movable member which is parallel to said latter fixed member;

(h) the webbing which passes between said third and fourth stations being circuitously threaded among the various rollers of said third and fourth sets; and (i) drive means coupled to said latter movable member for continuously applying a force thereto tending to move said latter movable member laterally away from said latter fixed member, said force being effective to so move the latter movable member only when the feed through the second station is in the advance condition.

References Cited

UNITED STATES PATENTS

| | | | |
|---|---|---|---|
| 2,374,356 | 4/1945 | Keuffel et al. | 156—345 |
| 2,849,298 | 8/1958 | Werberig | 156—3 |

JACOB H. STEINBERG, *Primary Examiner.*